United States Patent [19]
Eder et al.

[11] Patent Number: 5,753,858
[45] Date of Patent: May 19, 1998

[54] SECUREMENT OF WALL PLATE TO ELECTRICAL RECEPTACLE

[75] Inventors: John M. Eder, Floral Park; Wen-Hua Hsu, Forest Hills, both of N.Y.

[73] Assignee: Eagle Electric Manufacturing Co., Inc., Long Island City, N.Y.

[21] Appl. No.: 783,442

[22] Filed: Jan. 16, 1997

[51] Int. Cl.⁶ .................................................. H02G 3/14
[52] U.S. Cl. .................. 174/53; 174/66; 220/241; 411/437; 411/970; 411/999
[58] Field of Search .................. 174/53, 66; 220/3.8, 220/241; D8/350, 351, 352, 353; 411/433, 437, 999, 970, 301

[56] References Cited

U.S. PATENT DOCUMENTS

| | | | |
|---|---|---|---|
| 1,690,078 | 10/1928 | Pierce | 411/970 X |
| 2,492,115 | 12/1949 | Crowther | 174/66 X |
| 3,229,743 | 1/1966 | Derby | 411/970 X |
| 4,355,198 | 10/1982 | Gurtland, Jr. | 174/66 |
| 5,057,649 | 10/1991 | Ring | 411/437 X |
| 5,524,330 | 6/1996 | Alberini | 174/66 X |

*Primary Examiner*—Bot L. Ledynh
*Assistant Examiner*—Dean A. Reichard
*Attorney, Agent, or Firm*—Kirschstein, et al.

[57] ABSTRACT

An electrical device to be mounted on a support includes a housing having an inner part and an outer part secured to one another. The housing is mounted on the support in a position in which the outer part of the housing is accessible. A cover plate is provided for obscuring the view of at least a portion of the housing and surrounding areas of the support. The cover plate has at least one through opening in it. The cover plate is secured to the housing by a screw passing through the opening and an aperture. The screw engages the thread of a threaded bore when the device is fully assembled. The outer housing part includes webs at or within the opening for engaging the shank of the screw and temporarily holding it, and with it the cover plate, in their proper positions prior to engagement of the shank thread with the bore thread.

7 Claims, 1 Drawing Sheet

SECUREMENT OF WALL PLATE TO ELECTRICAL RECEPTACLE

BACKGROUND OF THE INVENTION

1. Field of the Invention

The present invention relates to the mounting of various parts on one another in general, and more particularly to securing a wall plate to an electrical outlet housing.

2. Description of the Related Art

There are already known different methods of connecting various parts to one another, among them such employing screws as the connecting means. This connecting method is prevalent in the field of manufacturing and/or assembling electrical devices, such as electrical wall outlets in the context of which the present invention will be discussed. The connection under consideration here is that securing a cover plate to the housing of an electrical outlet device already received and firmly held in position in an electrical outlet box mounted in a wall.

Traditionally, this securing has been accomplished by first properly positioning the cover plate over the outlet box so that it covers and extends beyond the outer periphery of such an outlet box and the usually unsightly edges of the opening provided for it in the wall. The cover plate also surrounds a protruding portion of the outer or front part of the outlet device housing. Then, the shank of a screw is inserted into a through opening of the cover plate that receives the shank with a certain amount of leeway, and the screw is maneuvered until the leading end of the screw reaches the proximal end of a threaded bore provided in the housing, ordinarily after passing through a hole provided for its passage in the outer part of the housing. Finally, a screwdriver is used for threading the screw in.

It will be appreciated even by those who have never tried to do this, and it is well known to those who have, that this is not a very easy task to accomplish by any one person because it requires at least three hands: one for holding the plate in position, another one for holding the screw in position after it has been properly positioned, and the last one for manipulating the screwdriver while the other two hands are keeping the plate from falling off and the screw from falling out. Of course, those who had to perform this task have invariably, out of necessity, come up with various methods of accomplishing these three tasks by using only two hands; yet, experience has shown that even those who are rather skilled in performing this task, such as electricians and other people making their living by installing, repairing and/or replacing electrical devices of the type here under consideration, are at least occasionally delayed in the performance of this task by a slipping or tilting cover plate and especially a falling-out connecting screw.

A partial solution to this problem has been proposed in the U.S. Pat. No. 4,355,198 to Gartland, Jr. in that two rigid webs are provided at mutually opposite sides of the through opening provided in the cover plate. These rigid webs reduce the effective diameter of the aforementioned opening at their location to less than the outer diameter of the threaded shank portion of the connecting screw. The end result of this feature is that the screw is held captive on the cover plate, so that it need not be separately held in place. This, of course, means that the installer needs only one hand to hold the cover plate in its proper position, which automatically results in at least substantial alignment of the shank of the screw with the threaded opening provided for it in the outlet housing. Then, at least ideally, it is sufficient to hold a screwdriver in the other hand, use it to engage the head of the screw which will push the leading end of the screw into a proper position for engagement with the internally threaded hole provided in the device housing for this very purpose.

Unfortunately, things are not always what they are supposed to be, and this is the case in this construction as well. So, for instance, because there are two webs and the screw shank ordinarily has only one continuous thread on it, there is a natural tendency for the screw to get skewed in the web-equipped hole provided in the cover plate. Even if this were not true, however, there would still be the possibility, even likelihood, that the screw would not pass through this webbed hole in complete perpendicularity to the plane along which the cover plate extends.

This has two potential unpleasant consequences: for one, the degree of tilt could be so great that the leading end of the screw shank would not find the internally threaded bore but rather abut another part of the device housing. On the other hand, the degree of tilt could be relatively small, but large enough that the external and internal threads would not properly engage. In either event, the action of the aforementioned webs on the screw shanks would hamper the efforts aimed at remedying this situation, so that it might be necessary to remove the cover plate from the wall and either straighten the screw out as to its position relative to the cover plate, if possible, or even remove the screw altogether and try to reinsert it. Sometimes, the webs break off during the removal and reinsertion of the screw, thereby defeating their intended function. All of this, of course, detracts from the efficiency of the operation. Moreover, professional installers find it inconvenient to have to use both hands at the same time for a simple installation like this, and complain about it constantly.

These problems are not even addressed, much less resolved, in the arrangements disclosed in the U.S. Pat. Nos. 4,658,088, to Gartland et al and 5,524,330 to Alberini; in the latter one, it is again the part to be connected to another part that is provided with the webs (this time with metallic ones); the former patent discloses a different approach completely, namely the use of a self-cutting thread on the screw shank for forming a corresponding thread in an originally unthreaded, smaller-diameter bore in the part to which the cover plate is to be connected.

OBJECTS OF THE INVENTION

Accordingly, it is a general object of the present invention to avoid the disadvantages of the prior art.

More particularly, it is an object of the present invention to provide an arrangement for securing one part to another, which arrangement does not possess the drawbacks of the known arrangements of the aforementioned type.

Still another object of the present invention is to devise a securing arrangement of the type here under consideration which is particularly suited for use in an electrical outlet environment.

It is yet another object of the present invention to design the above in such a manner as to simplify and facilitate the assembly of a cover plate with the housing of the electrical outlet.

A still further object of the present invention is to develop a securing arrangement of the above type in which the possibility of misalignment is minimized, if not eliminated, and in which the installer has a greater freedom of movement during installation than ever before.

A concomitant object of the present invention is so to construct the arrangement of the above type as to be relatively simple in construction, inexpensive to manufacture, easy to use, and yet reliable in operation.

SUMMARY OF THE INVENTION

In keeping with the above objects and others which will become apparent hereafter, one feature of the present invention resides in an electrical device to be mounted on a support. This device includes a housing having an inner part and an outer part secured to one another; means for mounting the housing on the support in a position in which the outer part of the housing is accessible; a cover plate for obscuring the view of at least a portion of the housing and surrounding areas of the support, the cover plate having at least one through opening therein; and means for securing the cover plate to the housing, including an internally threaded bore in the inner part of the housing, a through aperture in the outer part of the housing that is substantially aligned with the threaded bore and with the through opening of the cover plate when the latter is in its proper position relative to the housing and the support, and a screw having an externally threaded shank passing through the through opening of the cover plate, through the through aperture of the outer part of the housing, and into the threaded bore of the inner part of the housing and into engagement therewith upon full assembly of the device.

According to the present invention, this electrical device further includes means at the aperture of the outer part of the housing for temporarily holding the screw and via the same the cover plate in position when the screw shank is inserted deep enough to be engaged by such holding means but not deep enough for its thread to engage the thread of the threaded bore.

According to an advantageous aspect of the present invention, the temporary holding means includes a plurality of webs projecting into the through aperture of the outer part of the housing and engaging the shank of the screw when the latter is inserted to a predetermined extent into the aperture. It is further advantageous for the plurality to include at least three of the webs. Such webs are advantageously equiangularly distributed within the aperture. Last but not least, the webs are flexible enough to yield out of the way of the shank when the latter is displaced into and through the aperture and/or removed therefrom, without breaking.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
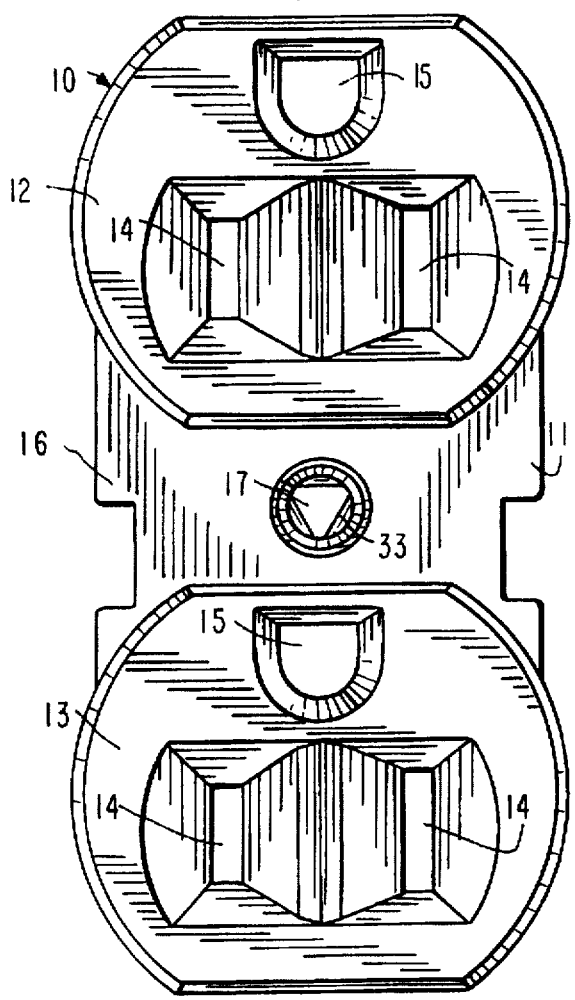
FIG. 1 is a front elevational view of an outer housing part of double outlet electrical receptacle embodying the present invention, drawn to a scale enlarged with respect to actual conditions.

Referring now to the drawing in detail, and first to FIG. 1 thereof, it is to be mentioned first that the reference numeral 10 has been used therein to identify a double outlet electrical receptacle unit in its entirety; however, in order not to unduly encumber the drawing by showing parts that are unaffected by the present invention, only a front or outer part of the housing 10, denoted by the reference numeral 11, is shown in the various views presented in the drawing. On the other hand, most of the rest of the housing 10 and of the parts associated therewith has either been omitted or is being shown only in general terms, that is, to indicate mutual relationships and cooperation of the various parts, not necessarily their actual positions and shapes and/or the connections between them.

In the double-outlet electrical receptacle implementation of the invention revealed in the various views of the drawing, the outer part 11 of the housing 10 is shown to include two outlet portions 12 and 13 arranged next to each other and provided with conventionally configured passage portions 14 and 15 for the passage of the prongs and/or electrical or grounding contacts of an electrical plug therethrough. The two outlet portions 12 and 13 are connected to one another by a web 16 which is provided with a central opening 17.

Figure 2:
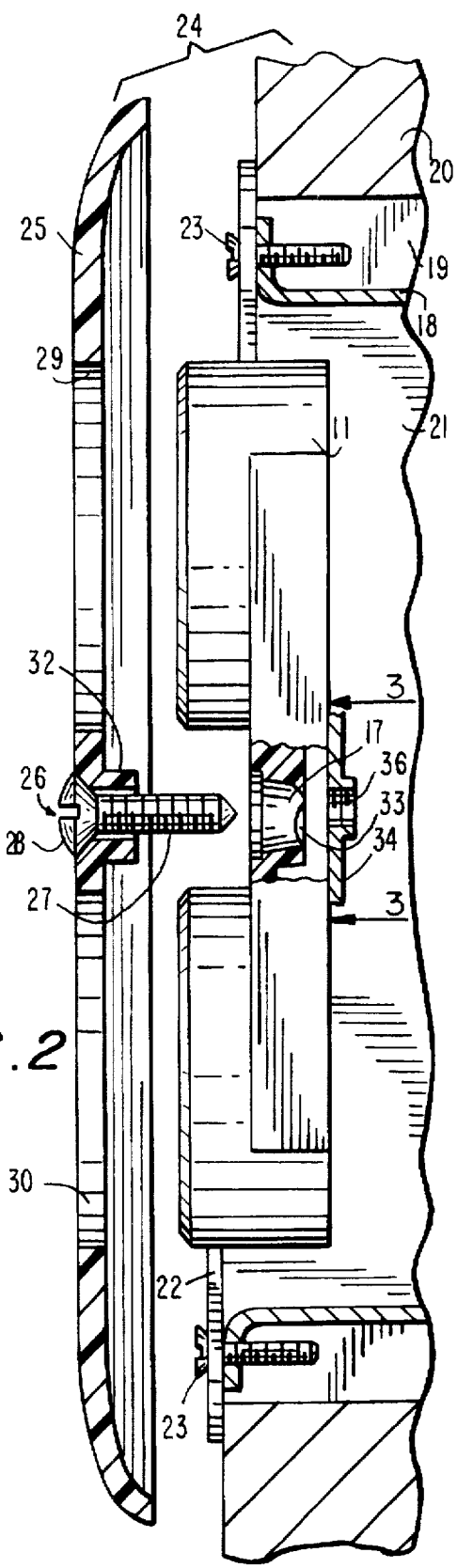
FIG. 2 is a view showing in a partially sectioned side elevation the double outlet electrical receptacle outer housing part of FIG. 1, and in cross section a cover plate in a position of readiness for assembly with the outer housing part, both on a scale corresponding to that of FIG. 1.

As indicated in FIG. 2 of the drawing, an electrical outlet box 18 is received in an opening 19 provided in a wall or a similar structure 20, and is held in position there in any known manner that is not indicated in the drawing. The outlet box 18 bounds a recess 21 that accommodates most of the housing 10 when in use, with the exception of a relatively small front portion of the outer housing part 11. Of course, the housing 10 is connected, in one way or another, either to the box 18 (ordinarily) or to the structure 20. This is indicated in FIG. 2 of the drawing, in a rather simplified manner, by showing a bracket 22 that is secured in an undisclosed manner to the housing 10 and particularly to its illustrated outer part 11. This bracket 22, in turn, is secured to the electrical outlet box 18 by respective screws 23.

As already alluded to before, the electrical outlet arrangement as described so far in conjunction with the drawing is of a conventional construction, and so is the non-illustrated rest of the housing 10. However, for the sake of completeness, it is to be mentioned that the rest (that is the back part) of the housing 10 includes electrical contacts or terminals that come into electrical contact with the prongs or contacts of the aforementioned electrical plug when such plug contacts are fully inserted into the respective portion of the housing through the respective passages 14 or 15, as well as electrically conductive means (usually including terminal screws) for connecting such receptacle contacts with respective ends of the "live", "neutral" and "ground" wires penetrating into the compartment 21 of the box 18.

Moreover, the back part of the housing 10 is also provided, in a fully conventional manner, with a strap 34 having an internally threaded bore 36 that is aligned with the opening 17 of the outer housing part 11. This threaded bore 36 serves, in conventional arrangements of this type, as the sole means for connecting another part of an outlet assembly 24, namely a cover plate 25 (which may also be referred to as a wall plate or an escutcheon in the specifically disclosed embodiment of the present invention), to the housing 10. The bore 36 can be a single thread, or a plurality of threads.

This connecting action is performed by a screw 26 that includes an externally threaded shank 27 and an enlarged head 28. Of course, when the assembly is complete, the shank 27, after having passed through the opening 17 is threaded into and engages the internal thread 36 of the back housing part, whereas the enlarged head 28 engages behind (actually, in front of) the cover plate 25 and presses the periphery of the latter into contact with the wall 20. Of course, as also conventional, the cover plate 25 is provided with respective through openings 29 and 30 which are configured substantially conformingly to the portions 12 and 13 of the outer part 11 of the housing 10 to receive the protruding regions of the parts 12 and 13 with only a minimum amount of leeway, and the shank 27 of the screw passes through another opening 32 provided in the cover plate 25. This opening 32, for obvious reasons, is in substantial alignment with the internally threaded bore 36 of the back part of the housing 10, and hence with the opening 17 of the outer part 11 when the cover plate 25 is properly positioned with respect to (around) the protruding regions of the portions 12 and 13.

Having so described the salient features of the equipment in conjunction with which the present invention is to be used to advantage, the time has come to focus on the improvement constituting the present invention itself. As a comparison of FIGS. 2 and 3 of the drawing will reveal, there is provided a plurality of flexible webs 33 (as shown, three of them), situated in the opening 17 provided in the outer or front part 11 of the housing 10. Inasmuch as this part 11, for esthetic and other reasons, is made of a synthetic plastic material, especially a thermoplastic material, it is easy to provide the webs 33 as this part is being cast, molded, or otherwise shaped, and to give them such dimensions that they exhibit the desired degree of flexibility. The webs 33 provide a unique purpose, operation and effect. For one, the webs 33 no longer connect the screw 26 to the wall plate 25. This, of course, means that the screw 26 could fall out of the opening 32 if inserted into it before the final assembly of the wall plate 25 with the housing 10; this, however, can be easily avoided by the installer's holding a finger or thumb possibly of the very same hand as that holding the plate 25 over the head 28 of the screw 26 inserted into the opening 32, or, better yet, by not inserting the screw 26 into the opening 32 prematurely.

This seeming step backwards from the solutions presented in two of the aforementioned patents, however, has certain highly desirable and unobvious advantages. One of them, a relatively minor one, is that, by putting the webs 33 closer to the leading end of the threaded bore of the housing 10, the likelihood of tilting of the screw 26 as it is pushed toward the threaded bore 36 is significantly (many times) reduced relative to what it was in the past. In effect, the bore 17 and the webs 33 provided therein serve as guides for the shank 27 on its way to the aforementioned threaded bore of the housing 10.

Moreover, and probably more significantly, the provision of the webs 33 on the part 11 (i.e., in its opening or bore 17) changes the very operation of the webs, and as a result the way the screw 26 and the plate 25 are handled during the assembly. More particularly, the assembling operation starts with either (and preferably) the placement of the wall plate 25 in the proper position using one hand, followed by insertion of the screw 26 with the other hand into the opening through an unobstructed opening 32 and beyond the same until the shank 27 of the screw 26 encounters the webs 33; in a less desirable alternative which may, though, be preferred by some installers, the screw 26 is inserted into the opening 32 first, and then the assembly of the screw 26 with the plate 25 is properly positioned. In this positioning process, the screw 26 will be pushed out of the opening to some extent once it encounters the webs 33.

No matter in which order the operations described above are performed, though, the end result is the same: the leading end of the shank 27 of the screw 26 is at, and eventually in contact with, at least one of the webs 33. After that, a push on the head 28 of the screw 26 will displace the webs 33 out of the way of advancement of the screw shank 27 until they engage in the grooves or even on the crests of the thread of the shank 27. Once that happens to a meaningful extent (i.e. the webs have moved beyond the first or second turn of the thread), the installer can let go not only of the screw 26, but also of the cover plate 25, because the screw 26 is safely lodged between and held against extraction by the webs 33, and the head 28 of the screw 26 holds the cover plate 25 in close proximity to its desired final position in juxtaposition with the wall 20.

It ought to be noted that up to this point, there was no need to employ the screwdriver, so that the latter may still be in a holster or tool box at this time. However, now the installer has both hands free to rummage through the tool box in search of the proper screwdriver, or even is free to go to a different location where he or she may have left this tool after the last preceding installation, and rest assured that upon finding or returning with the tool both the screw 26 and the cover plate 25 will still be in or close to the position he or she had left them in.

Then, another push on the screw 26 until its leading end arrives in perfect alignment (due to the centering or guiding action of the webs 33) at the proximal end of the internally threaded bore 36 provided in the housing 10, followed by a few turns of the screwdriver in engagement with the slotted (as shown) or otherwise conventionally shaped head 28 of the screw 26, and the screw 26 is fully driven in and holds the cover plate 25 in contact with at least the outer housing part 11 but usually also with the wall 20. These final pushing in and tightening operations are one-hand operations, thus removing the installer's objection to the previously existing need for using both hands to accomplish this relatively simple operation. Of course, it may be sometimes necessary to adjust the position of the cover plate 25 during the last phase of the screw-tightening operation; however, this more or less aesthetic adjustment is not perceived to be as unpleasant, if at all, as the need to hold the plate 25 constantly during the entire screw-insertion and screw-tightening operation, and especially between these two operations when it may be necessary for the installer to fumble around to locate the proper tool. All in all, the installation operation as described above, which is a direct result of the present invention, is perceived to be much less cumbersome than any heretofore known operations of this kind.

Figure 3:
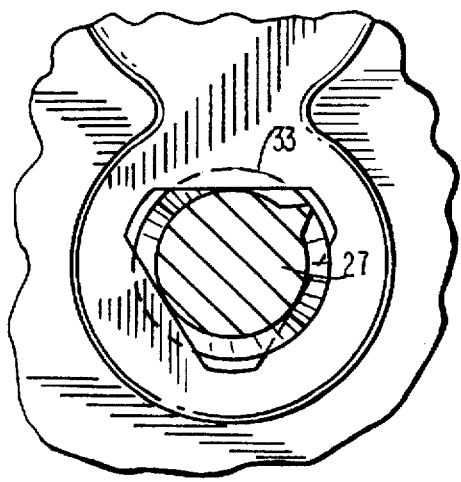
FIG. 3 is a fragmentary view taken on line 3—3 of FIG. 2 but only after the cover plate has been assembled with the outer housing part, on a scale further enlarged relative to that of FIGS. 1 and 2.

It is to be noted at this point that the threesome of the webs 33 has an advantage over the heretofore proposed pair (albeit at an altogether different location), namely the fact that, as clearly evident from FIG. 3 of the drawing, while one of the webs 33 penetrates into the valley between the threads, both of the remaining two webs 33 are in engagement with the crests of the thread. This further reduces, if not altogether eliminates, the likelihood that the forces that the webs 33 exert on the screw 26 could tilt the latter out of its desired (substantially perpendicular) position relative to the cover plate 25. It ought also to be mentioned at this juncture that the material of the part 11 is flexible enough (in the thickness corresponding to that of the webs 33) to merely plastically deform, rather than being broken away. This means that the action of the webs 33 is available over and over again during each reinstallation of the same outlet housing 10.

It is also to be reiterated and restated here that one particular reason why those features that are not essential to the invention proper have been omitted is because all of them are well known but may vary from one manufacturer to another without, however, having any bearing on the present invention, so that their inclusion would unnecessarily obscure the distinction between what is and what is not critical in the context of the present invention Along a similar vein, it is to be mentioned that, while the present invention was described above as used in conjunction with or in the environment of the aforementioned double or duplex outlet electrical receptacle housing 10, and particularly that intended to be mounted in a wall outlet box 18, the principles that have been explained above in this context will have the same, similar, or equivalent applicability to other electrical devices, such as single outlets, multiple (three or more) outlets, single or multiple switches of various kinds, electrical control devices such as voltage or current controllers, ground fault protector units, etc., whether mounted in wall boxes or in stand-alone or externally mounted casings, or even to non-electrical devices, so long as certain conditions that should have become apparent as in the course of the preceding description are satisfied.

One of these conditions is that the device in question include a housing to which another part is to be connected by at least one screw. Another condition, and probably the most important one as far as the present invention is concerned, is that the housing includes a part, whether integral with the remainder of the housing or separate from it but secured thereto by means other than the aforementioned screw, which is provided with a through bore, the diameter of which conventionally exceeds the largest diameter of the threaded portion of the aforementioned screw. Last but not least, the aforementioned part has to be of a material which, while quite rigid, still exhibits at least limited flexibility at least when this thickness is at or below a certain level.

It will be understood that each of the elements described above, or two or more together, may also find a useful application in other types of constructions differing from the type described above.

While the present invention has been described and illustrated herein as embodied in a specific construction of a double outlet electrical receptacle mounted on a wall, it is not limited to the details of this particular construction, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters patent is set forth in the appended claims:

1. An arrangement for securing a cover plate having a through opening to an electrical device mounted on a support, comprising:

a) a housing for the electrical device, including an outer part having a through aperture, and an inner part having an internally threaded bore in alignment with said through aperture;

b) a screw having an externally threaded shank insertable with clearance through said through opening of said cover plate, and through said through aperture of said outer part and into threaded engagement with said threaded bore of said inner part upon full turning of the screw; and c) a plurality of webs located at, and projecting into, said through-aperture of said outer part, said plurality of webs engaging said shank and temporarily holding said cover plate and said screw in a fixed position relative to said housing prior to said full turning of the screw.

2. The arrangement as defined in claim 1, wherein said plurality of webs includes three webs.

3. The arrangement as defined in claim 1, wherein said webs are equiangularly distributed within said through aperture.

4. The arrangement as defined in claim 1, wherein said webs are integral with, and resiliently flexible relative to, said outer part of said housing.

5. The arrangement as defined in claim 1, wherein the housing is a duplex electrical receptacle having two outlet portions, and wherein said outer part extends between and interconnects said outlet portions; and wherein said through aperture extends through said outer part midway between said outlet portions.

6. The arrangement as defined in claim 5, and wherein said webs are integral with said outer part.

7. The arrangement as defined in claim 6, wherein said receptacle and said webs are constituted of a moldable synthetic plastic material.

\* \* \* \* \*